US011427099B2

(12) United States Patent
Lyon (10) Patent No.: US 11,427,099 B2
(45) Date of Patent: Aug. 30, 2022

(54) TEMPERATURE SENSOR FOR TERMINAL OF CHARGING INLET ASSEMBLY

(71) Applicant: TE CONNECTIVITY CORPORATION, Berwyn, PA (US)

(72) Inventor: Zachary Wood Lyon, Lewisville, NC (US)

(73) Assignee: TE Connectivity Services GmbH

( * ) Notice: Subject to any disclaimer, the term of this patent is extended or adjusted under 35 U.S.C. 154(b) by 534 days.

(21) Appl. No.: 16/572,295

(22) Filed: Sep. 16, 2019

(65) Prior Publication Data

US 2021/0078419 A1 Mar. 18, 2021

(51) Int. Cl.
*B60L 53/16* (2019.01)
*G01K 1/14* (2021.01)

(52) U.S. Cl.
CPC ............... *B60L 53/16* (2019.02); *G01K 1/14* (2013.01)

(58) Field of Classification Search
CPC ....... B60L 53/16; B60L 2240/36; G01K 1/14; Y02T 10/70; Y02T 10/7072; Y02T 90/14; H01R 13/6683
See application file for complete search history.

(56) References Cited

U.S. PATENT DOCUMENTS

2018/0050599 A1 * 2/2018 Sauer ..................... B60L 53/305

FOREIGN PATENT DOCUMENTS

EP             2995496 A1 *  3/2016   ........... B60L 11/1818
WO    WO-2020093397 A1 *  5/2020   ............. G01K 1/024

* cited by examiner

Primary Examiner — An T Nguyen (57) ABSTRACT

A terminal for a charging inlet assembly includes a head secured in a terminal channel of a housing of the charging inlet assembly having a terminating end configured to be terminated to a power cable. The head has a temperature sensor channel extending longitudinally therethrough open at the rear of the terminal. The terminal includes a pin at a front of the terminal. The pin has an outer surface defining a separable mating interface for mating engagement with a charging conductor of a charging connector. The terminal includes a temperature sensor assembly received in the temperature sensor channel. The temperature sensor assembly includes a temperature sensor and a lead extending from the temperature sensor through the temperature sensor channel. The temperature sensor is axially aligned with the separable mating interface of the pin within an interior of the terminal for sensing a temperature of the pin.

20 Claims, 7 Drawing Sheets

TEMPERATURE SENSOR FOR TERMINAL OF CHARGING INLET ASSEMBLY

BACKGROUND OF THE INVENTION

The subject matter herein relates generally to charging inlet assemblies.

In order to charge a battery of an electric vehicle (EV) or hybrid electric vehicle (HEV), the vehicle is provided with a charging inlet assembly. A charging connector is configured to be mated with the charging inlet assembly. Terminals are held in a receptacle connector of a housing of the charging inlet assembly. The terminals are heated during charging, which may cause damage to the terminals if exceeding a threshold temperature. In some known charging inlet assemblies, temperature sensors are provided that are coupled to the outside of the terminal to monitor the temperature of the terminal. However, the temperature sensor is typically located at the rear end of the terminal spaced a distance from the mating interface of the terminal. There are latency problems with sensing the temperature of the terminal remote from the mating interface.

A need remains for a charging inlet assembly having improved temperature sensing for terminals of the charging inlet assembly.

BRIEF DESCRIPTION OF THE INVENTION

In one embodiment, a terminal for a charging inlet assembly is provided. The terminal includes a head at a rear of the terminal. The head is configured to be secured in a terminal channel of a housing of the charging inlet assembly. The head has a terminating end configured to be terminated to a power cable. The head has a temperature sensor channel extending longitudinally therethrough. The temperature sensor channel is open at the rear of the terminal. The terminal includes a pin at a front of the terminal. The pin has an outer surface defining a separable mating interface for mating engagement with a charging conductor of a charging connector. The terminal includes a temperature sensor assembly received in the temperature sensor channel. The temperature sensor assembly includes a temperature sensor and a lead extending from the temperature sensor through the temperature sensor channel. The temperature sensor is axially aligned with the separable mating interface of the pin within an interior of the terminal for sensing a temperature of the pin.

In another embodiment, a terminal for a charging inlet assembly is provided. The terminal includes a head at a rear of the terminal. The head is configured to be secured in a terminal channel of a housing of the charging inlet assembly. The head has a terminating end configured to be terminated to a power cable. The head has a temperature sensor channel extending longitudinally therethrough. The temperature sensor channel is open at the rear of the terminal. The terminal includes a replaceable pin at a front of the terminal. The replaceable pin is removably coupled to the head. The replaceable pin has a front and a rear. The replaceable pin has an outer surface defining a separable mating interface for mating engagement with a charging conductor of a charging connector. The terminal includes a temperature sensor assembly received in the temperature sensor channel. The temperature sensor assembly includes a temperature sensor and a lead extending from the temperature sensor through the temperature sensor channel. The temperature sensor is axially aligned with the pin within an interior of the pin for sensing a temperature of the pin.

In a further embodiment, a charging inlet assembly is provided. The charging inlet assembly includes a housing extending between a front and a rear. The housing has a terminal channel between the front and the rear. The charging inlet assembly includes a terminal received in the terminal channel and coupled to the housing. The terminal extends between a mating end and a terminating end. The terminating end is configured to be terminated to a power cable at the rear of the housing. The mating end is configured to be mated to a charging connector at the front of the housing. The terminal includes a head at the terminating end. The head is received in the terminal channel and is secured in the terminal channel. The head has a temperature sensor channel extending longitudinally therethrough. The temperature sensor channel is open at the rear of the terminal. The terminal includes a pin at the mating end. The pin has an outer surface defining a separable mating interface for mating engagement with a charging conductor of a charging connector. The terminal includes a temperature sensor assembly received in the temperature sensor channel. The temperature sensor assembly includes a temperature sensor and a lead extending from the temperature sensor through the temperature sensor channel. The temperature sensor is axially aligned with the separable mating interface of the pin within an interior of the terminal for sensing a temperature of the pin.

DETAILED DESCRIPTION OF THE INVENTION

Figure 1:
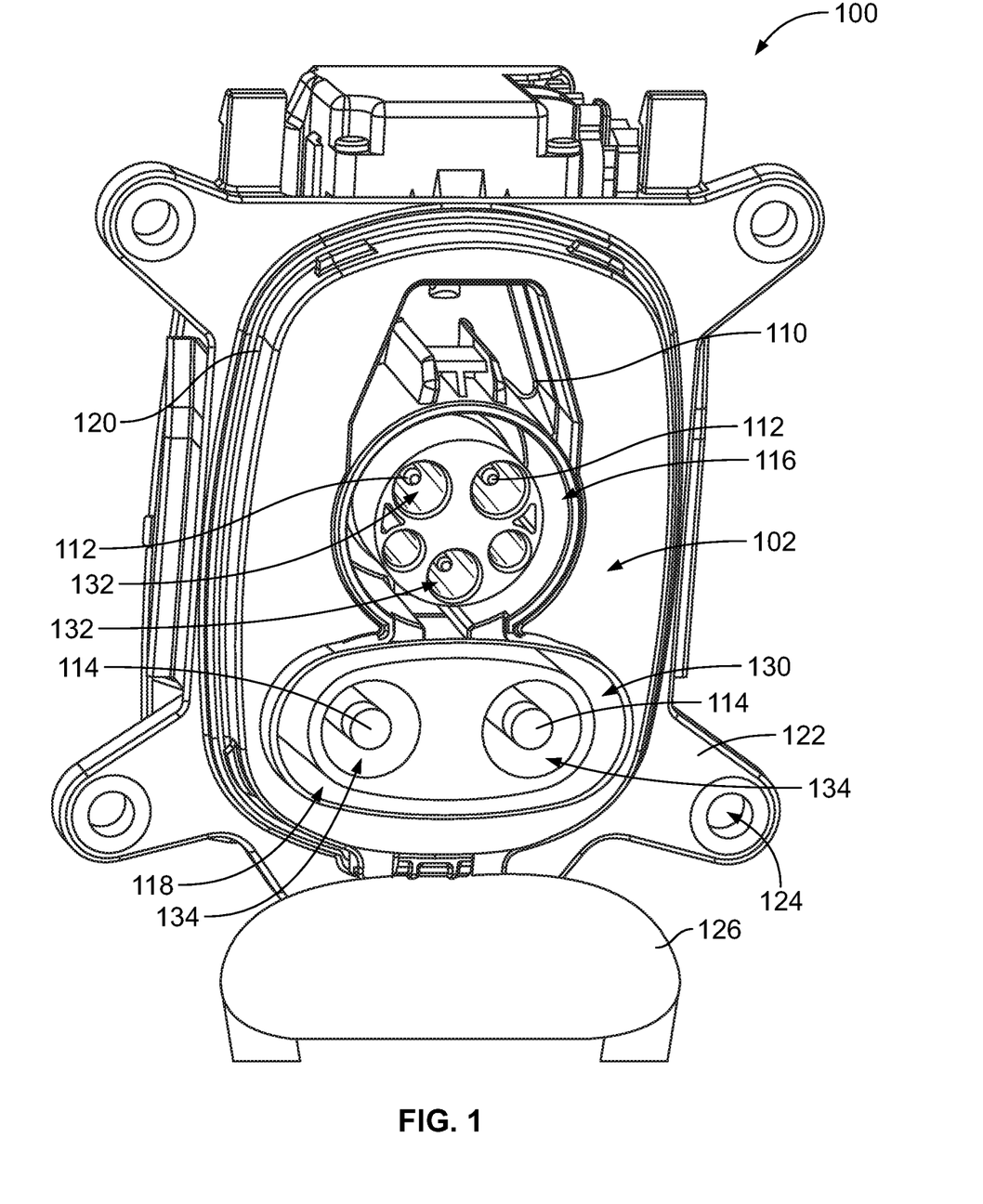
FIG. 1 is a front perspective view of a charging inlet assembly in accordance with an exemplary embodiment.

FIG. 1 is a front perspective view of a charging inlet assembly 100 in accordance with an exemplary embodiment. The charging inlet assembly 100 is used as a charging inlet for a vehicle, such as an electric vehicle (EV) or hybrid electric vehicle (HEV). The charging inlet assembly 100 includes a receptacle connector 102 configured for mating reception with a charging connector (not shown). In an exemplary embodiment, the receptacle connector 102 is configured for mating with a DC fast charging connector, such as the SAE combo CCS charging connector, in addition to AC charging connectors, such as the SAE J1772 charging connector.

The charging inlet assembly 100 includes a housing 110 holding terminals 112 and terminals 114. The housing 110 defines the receptacle connector 102. The terminals 112, 114 form part of the receptacle connector 102 and are configured to be mated to the charging connector. In an exemplary embodiment, the terminals 112 are AC terminals and the terminals 114 are DC terminals. The terminals 112 are arranged in a first connector port 116 of the receptacle connector 102 and the terminals 114 are arranged in a second connector port 118 of the receptacle connector 102.

The charging inlet assembly 100 includes a mounting flange 120 coupled to the housing 110. The mounting flange 120 is used to couple the charging inlet assembly 100 to the vehicle. The mounting flange 120 includes mounting tabs 122 having openings 124 that receive fasteners (not shown) used to secure the charging inlet assembly 100 to the vehicle. Other types of mounting features may be used to secure the charging inlet assembly 100 to the vehicle. The mounting flange 120 may include a seal to seal the charging inlet assembly 100 to the vehicle.

The charging inlet assembly 100 includes a cover 126 hingedly coupled to the mounting flange 120 and/or the housing 110. The cover 126 is used to cover the second connector port 118. FIG. 1 illustrates the cover 126 in an open position.

In an exemplary embodiment, the housing 110 includes sockets 130 at a front of the housing 110 that receive the charging connector. The housing 110 includes upper terminal channels 132 that receive the upper terminals 112 and lower terminal channels 134 that receive the lower terminals 114. The terminal channels 132 are provided in the upper connector pot 116. The terminal channels 134 are provided in the lower connector port 118.

Figure 2:
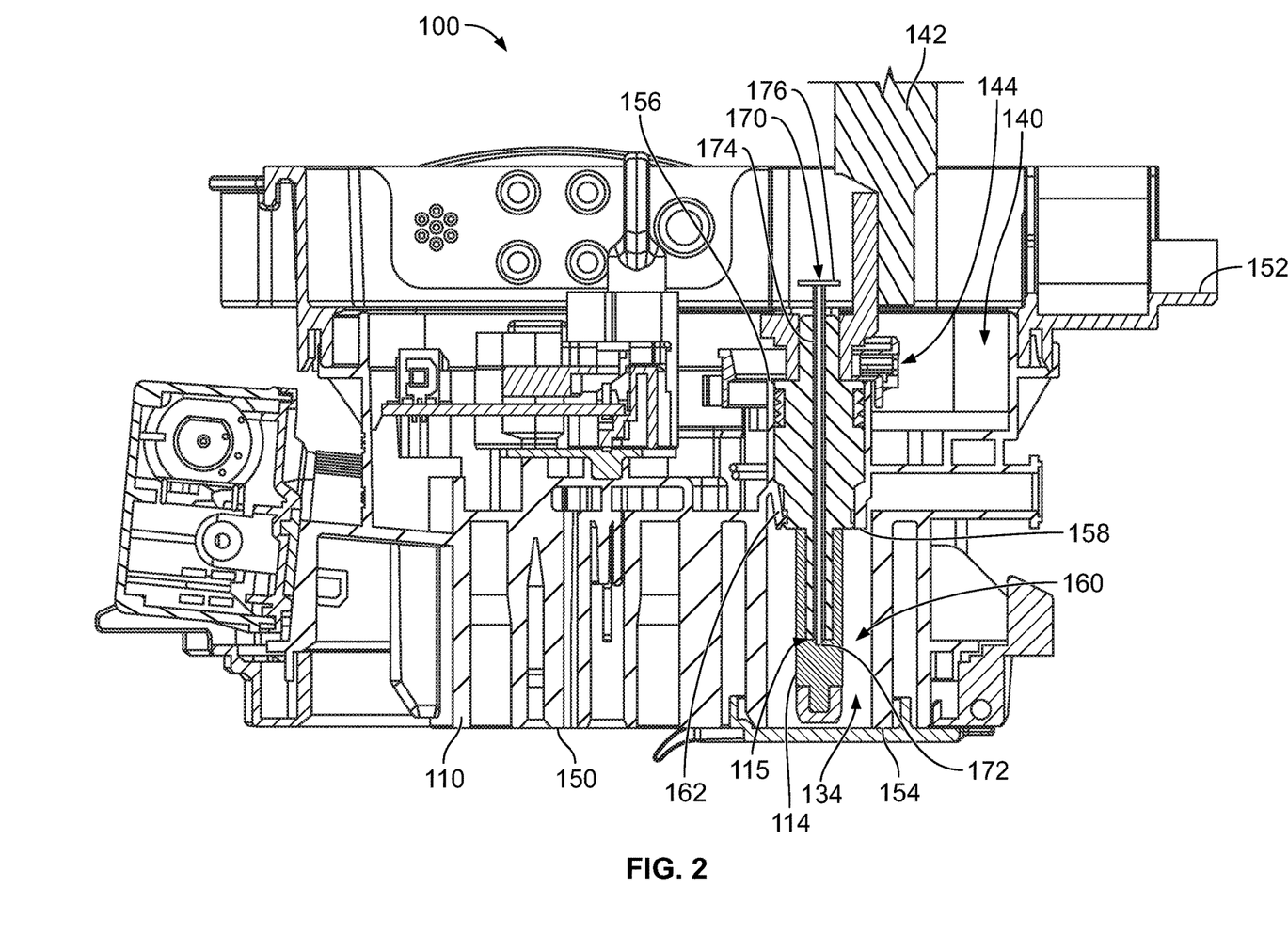
FIG. 2 is a cross-sectional view of the charging inlet assembly in accordance with an exemplary embodiment.

FIG. 2 is a cross sectional view of the charging inlet assembly 100 in accordance with an exemplary embodiment. FIG. 2 illustrates the terminal 114 coupled to the housing 110. The terminal 114 is received in the terminal channel 134. In an exemplary embodiment, the charging inlet assembly 100 includes a temperature sensor assembly 170 coupled to the terminal 114 to sense a temperature of the terminal 114. The temperature sensor assembly 170 includes a temperature sensor 172 received within an interior of the terminal 114 to sense an internal temperature of the terminal 114. The temperature sensor 172 senses a temperature of the terminal 114 proximate to the heat source or heat input to the terminal 114. For example, the temperature sensor 172 senses the temperature of the terminal 114 proximate to the mating interface of the terminal 114 with the charging conductor of the charging connector. As such, the temperature sensor assembly 170 avoids problems with latent heat sensing that is common with conventional charging inlet assemblies.

In various embodiments, the terminal 114 is a multi-piece terminal. For example, the front or mating end of the terminal 114 is removable and replaceable without removing or replacing the rear or main part of the terminal 114. The mating end is coupled to the main part of the terminal 114 at an interface 115. The separable mating interface, which is the portion of the terminal 114 matable with the charging connector, is replaceable for long term serviceability of the terminal 114, such as when the mating interface becomes worn, damaged, outdated, and the like. For example, over time, the plating or surface on the mating interface may become worn or damaged, such as from many mating cycles, from overheating, from debris, moisture, or interaction with other contaminants. The mating end of the terminal 114 is removable and replaceable without needing to disassemble the housing 110 from the vehicle. For example, the mating end of the terminal 114 is removable and replaceable from a front 150 of the housing 110 without needing to access other parts of the charging inlet assembly 100. In an exemplary embodiment, the temperature sensor 172 is positioned at the interface 115 between the mating part and the main part of the terminal 114. As such, the temperature sensor 172 is positioned close to the front of the terminal 114, such as in close proximity to the separable mating interface, for more accurate temperature sensing than monitoring the temperature of the rear end of the terminal 114. In other various embodiments, the terminal 114 is a single piece terminal rather than a multi-piece terminal.

In an exemplary embodiment, the terminal 114 extends rearward from the terminal channel 134 into a chamber 140 at a rear 152 of the housing 110. The terminal 114 may be terminated to a power cable 142 in the chamber 140. For example, the power cable 142 may be welded to the terminal 114. The power cable 142 may be ultrasonically welded to the terminal 114 (such as to a weld pad at a rear end of the terminal 114), creating a low resistance interface between the terminal 114 and the power cable 142. In other various embodiments, the terminal 114 may be crimped to the power cable 142, or terminated to the power cable 142 by other terminating processes.

In an exemplary embodiment, a secondary lock assembly 144 is used as a safety feature as a terminal position assurance device and a locking device for the terminal 114. The secondary lock assembly 144 is movable between a locked position and an unlocked position. In the locked position, the secondary lock assembly 144 engages the terminal 114 and blocks the terminal 114 from backing out of the terminal channel 134.

The terminal channel 134 extends between a front end 154 and a rear end 156. A mid-wall 158 separates the front end 154 and the rear end 156 of the terminal channel 134. The terminal channel 134 includes a bore 160 at the front end 154 of the terminal channel 134 forward of the mid-wall 158 configured to receive a portion of the charging connector. The bore 160 is oversized relative to the terminal 114 such that a space is defined around the terminal 114 that receives a charging conductor of the charging connector. In an exemplary embodiment, the temperature sensor assembly 170 extends into the terminal 114 such that the temperature sensor 172 is located in the terminal channel 134, such as forward of the mid-wall 158 in the bore 160.

The housing 110 includes a primary latch 162 extending into the terminal channel 134 to engage and retain the terminal 114 in the terminal channel 134. The primary latch 162 may be a deflectable latch. The primary latch 162 may be integral with the housing 110, such as co molded with the housing 110. In the illustrated embodiment, the primary latch 162 is located at the mid-wall 158. The primary latch 162 axially secures the terminal 114 in the terminal channel 134. The primary latch 162 resists rearward pull out of the terminal 114 from the terminal channel 134.

The temperature sensor assembly 170 includes the temperature sensor 172 and a lead 174 extending from the temperature sensor 172. The lead 174 passes through an opening or channel in the terminal 114 within an interior of the terminal 114. The temperature sensor assembly 170 includes a temperature sensor circuit 176 coupled to the lead 174. The temperature sensor circuit 176 is located exterior of the terminal 114, such as rearward of the terminal 114 in the chamber 140. The temperature sensor circuit 176 may be a flexible circuit in various embodiments. The temperature sensor circuit 176 may be a printed circuit board in various embodiments. In an exemplary embodiment, the temperature sensor circuit 176 is operably coupled to a control system of the charging inlet assembly 100 to control operation of the charging inlet assembly 100. For example, the charging operation may be shut off if the temperature sensed by the temperature sensor assembly 170 is above a threshold temperature or if a rate of temperature increase exceeds a threshold rate.

Figure 3:
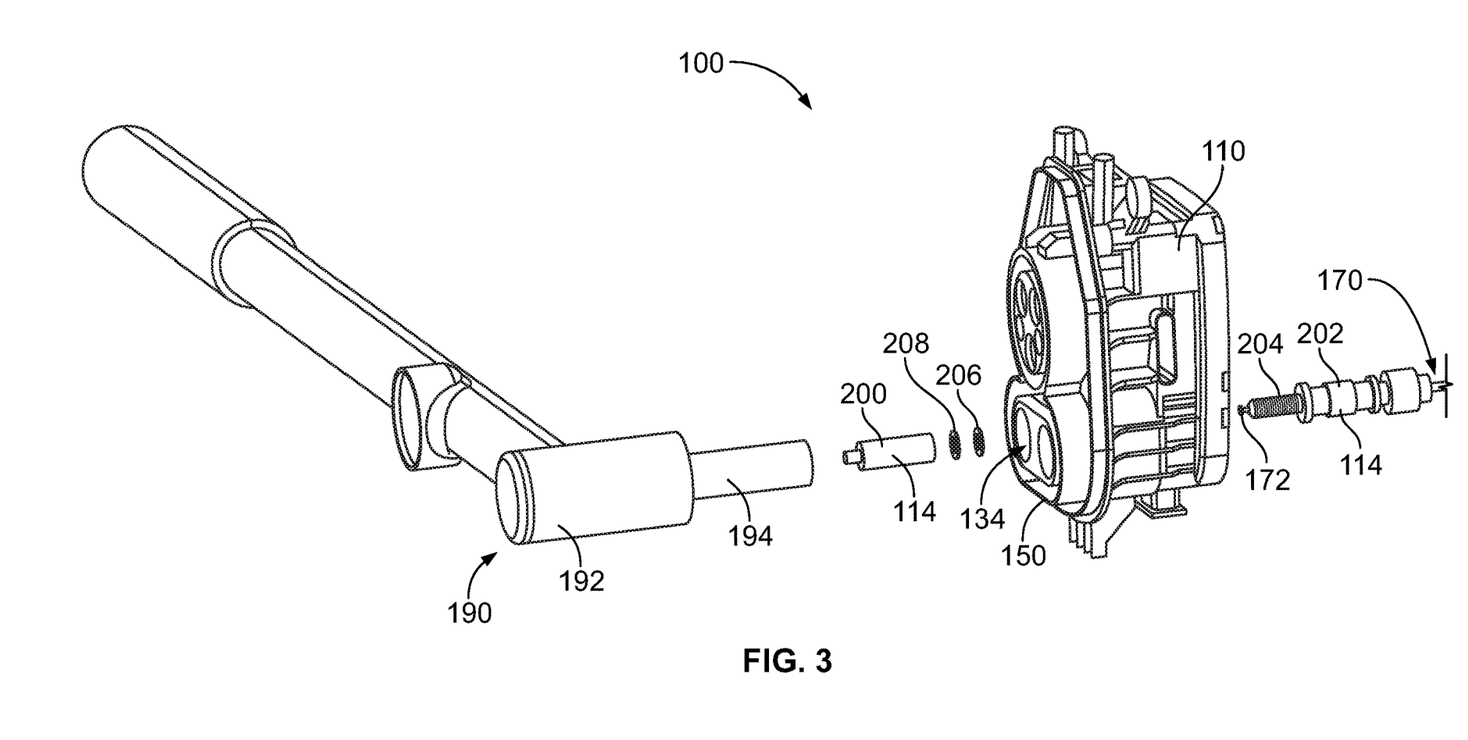
FIG. 3 is an exploded view of the charging inlet assembly in accordance with an exemplary embodiment.

FIG. 3 is an exploded view of the charging inlet assembly 100 in accordance with an exemplary embodiment. FIG. 3 shows the terminal 114 in separate pieces positioned relative to the housing 110 of the charging inlet assembly 100. FIG. 3 shows a socket tool 190 configured to be used for installing and removing the replaceable part of the terminal 114. The socket tool 190 includes a socket wrench 192 and a socket tool body 194 coupled to the socket wrench 192. The socket wrench 192 is used to rotate the socket tool body 194 to tighten or untighten the replaceable part of the terminal 114.

The terminal 114 includes a replaceable pin 200, a head 202, and a mating shaft 204 threadably coupled to at least one of the head 202 or the replaceable pin 200. The head 202 is configured to be secured to the housing 110 in the terminal channel 134. The replaceable pin 200 is configured to be received in the terminal channel 134 and is matable to the charging connector within the terminal channel 134. The replaceable pin 200 is configured to be removably coupled to the head 202 and removable from the front 150 of the housing 110 using the socket tool 190. The temperature sensor assembly 170 is coupled to the head 202 and/or the pin 200. In an exemplary embodiment, the temperature sensor 172 is configured to be positioned at the interface between the replaceable pin 200 and the head 202. For example, the temperature sensor 172 may be positioned at the front of the head 202 and thermally coupled to the replaceable pin 200 when the replaceable pin 200 is coupled to the head 202.

In an exemplary embodiment, the terminal 114 includes a spring 206 positioned between the replaceable pin 200 and the head 202. The spring 206 is used to spring bias the replaceable pin 200 in a forward direction, such as to mechanically and/or electrically and/or thermally couple the replaceable pin 200 and/or the mating shaft 204 and/or the head 202. In an exemplary embodiment, the terminal 114 includes a seal 208 positioned between the replaceable pin 200 and the head 202 and/or the mating shaft 204. The seal 208 may be an O-ring, a gasket, and the like. In alternative embodiments, the seal 208 may be grease or another type of sealant.

Figure 4:
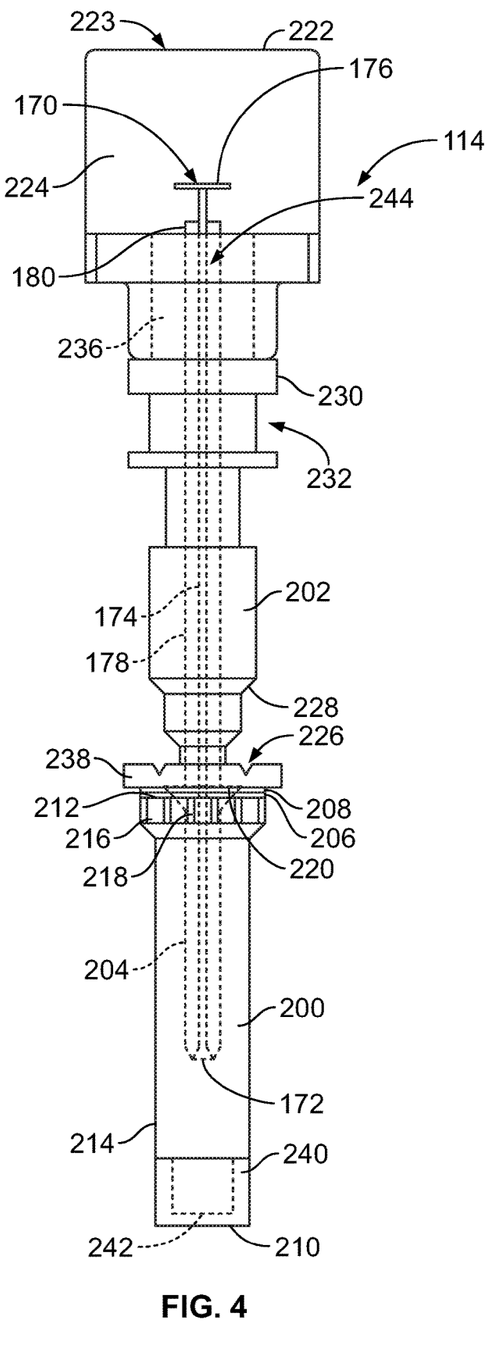
FIG. 4 is a side view of a terminal and a temperature sensor assembly of the charging inlet assembly in accordance with an exemplary embodiment.
Figure 5:
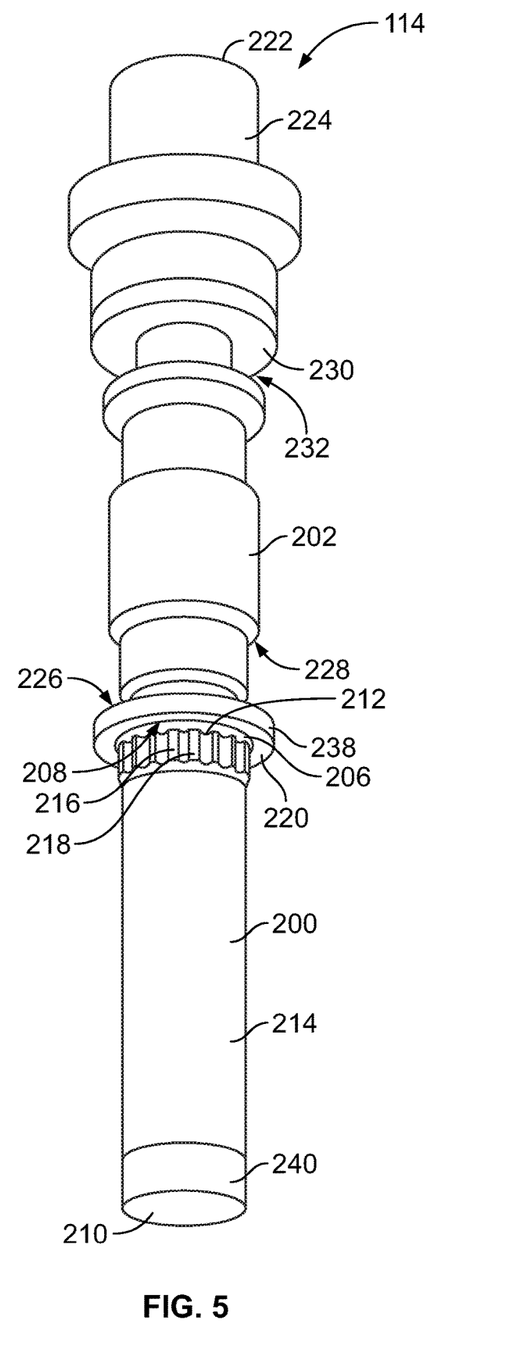
FIG. 5 is a perspective view of the terminal in accordance with an exemplary embodiment.

FIG. 4 is a side view of the terminal 114 and the temperature sensor assembly 170 in accordance with an exemplary embodiment. FIG. 5 is a perspective view of the terminal 114 in accordance with an exemplary embodiment. The terminal 114 includes the replaceable pin 200 and the head 202 electrically coupled to the replaceable pin 200. The mating shaft 204 is used to couple the replaceable pin 200 to the head 202. The replaceable pin 200 is separate and discrete from the head 202. The mating shaft 204 is part of the head 202 in various embodiments. However, the mating shaft 204 may be part of the pin 200 in alternative embodiments or may be separate from both the pin 200 and the head 202 in other alternative embodiments. The replaceable pin 200 is configured to be mated to the charging connector. The head 202 is configured to be terminated to the power cable 142 (shown in FIG. 3). The temperature sensor assembly 170 extends through the head 202 and the mating shaft 204 to sense the temperature of the replaceable pin 200. For example, the temperature sensor 172 is located proximate to (for example, axially aligned with) the mating interface with the charging connector.

The replaceable pin 200 is electrically conductive. For example, the replaceable pin 200 may be manufactured from a metal material, such as a copper material. In various embodiments, replaceable pin 200 is plated, such as with a silver plating. The replaceable pin 200 extends between a pin front 210 and a pin rear 212. The replaceable pin 200 includes an outer surface 214 configured to be mated to the charging connector. The outer surface 214 may be defined by a plating layer. In an exemplary embodiment, the replaceable pin 200 is cylindrical.

The replaceable pin 200 includes a drive base 216 at the pin rear 212. The drive base 216 includes drive teeth 218 configured to be engaged by the socket tool 190 (shown in FIG. 3) to rotate the replaceable pin 200 relative to the head 202 for installing or removing the replaceable pin 200. The drive teeth 218 extend circumferentially around the perimeter of the drive base 216. The drive teeth 218 extend radially outward. Optionally, the drive base 216 and the drive teeth 218 define a drive gear configured to be rotated by the socket tool 190. The spring 206 engages the drive base 216.

The head 202 is located rearward of the replaceable pin 200. The head 202 extends between a head front 220 and a head rear 222. In an exemplary embodiment, the head 202 has a terminating end 223 at the rear 222. The terminating end 223 is configured to be terminated to the power cable 142. In the illustrated embodiment, the terminal 114 includes a weld cap 224 at the terminating end 223 coupled to the rear 222 of the head 202. Optionally, the weld cap 224 may be separate and discrete from the head 202 and define an interface for terminating to the power cable 142. For example, the power cable 142 may be welded to the weld cap 224. Alternatively, the weld cap 224 may be integral with the head 202, such as formed or machined at the rear 222.

In an exemplary embodiment, the head 202 includes a latching groove 226 formed circumferentially around the head 202, such as near the front 220 of the head 202. In an exemplary embodiment, the head 202 includes a locating shoulder 228 formed circumferentially around the head 202. The locating shoulder 228 is used for locating the replaceable pin 200 in the terminal channel 134.

The head 202 includes a rear flange 230 at the rear 222. The rear flange 230 includes a groove 232 that receives the secondary lock assembly 144 (shown in FIG. 2). The head 202 includes a rear mounting post 236 (shown in phantom) extending rearward from the rear flange 230. The weld cap 224 may be press-fit on the rear mounting post 236. The rear mounting post 236 may be cylindrical, such as to allow the weld cap 224 to be rotatably positionable on the head 202. The head 202 includes a front flange 238 at the front 220. The replaceable pin 200 extends forward of the front flange 238. Optionally, the spring 206 engages the front flange 238. Optionally, the seal 208 may engage the front flange 238.

In an exemplary embodiment, the replaceable pin 200 includes a cap 240 at a tip 242 of the replaceable pin 200. The cap 240 is manufactured from a dielectric material, such as a plastic material. The cap 240 makes the terminal 114 touch-safe at the front of the housing 110.

In an exemplary embodiment, the head 202 includes a temperature sensor channel 244. The replaceable pin 200 may additionally include the temperature sensor channel 244. The temperature sensor channel 244 extends between the head front 220 and the head rear 222. The temperature sensor assembly 170 is received in the temperature sensor channel 244. The temperature sensor channel 244 allows the temperature sensor assembly 170 to extend through an interior of the terminal 114 to position the temperature sensor 172 proximate to the mating interface with the charging conductor. In the illustrated embodiment, the temperature sensor 172 is located at or forward of the head front 220. The lead 174 extends through the temperature sensor channel 244 to the rear 222, such that the temperature sensor circuit 176 is located exterior of the terminal 114. In an exemplary embodiment, the temperature sensor assembly 170 includes a sleeve 178 received in the temperature sensor channel 244. The sleeve 178 electrically isolates the lead 174 from the replaceable pin 200 and the head 202.

In an exemplary embodiment, the temperature sensor assembly 170 includes a seal 180 between the temperature sensor assembly 170 and the head 202 configured to seal the temperature sensor channel 244. The seal 180 may be an epoxy injection into the sleeve 178 and/or the temperature sensor channel 244. The seal 180 may be a gasket, an O-ring or another type of seal. The temperature sensor assembly 170 may include a retainer or other type of support structure for supporting the lead 174 and/or the temperature sensor circuit 176 exterior of the terminal 114.

Figure 6:
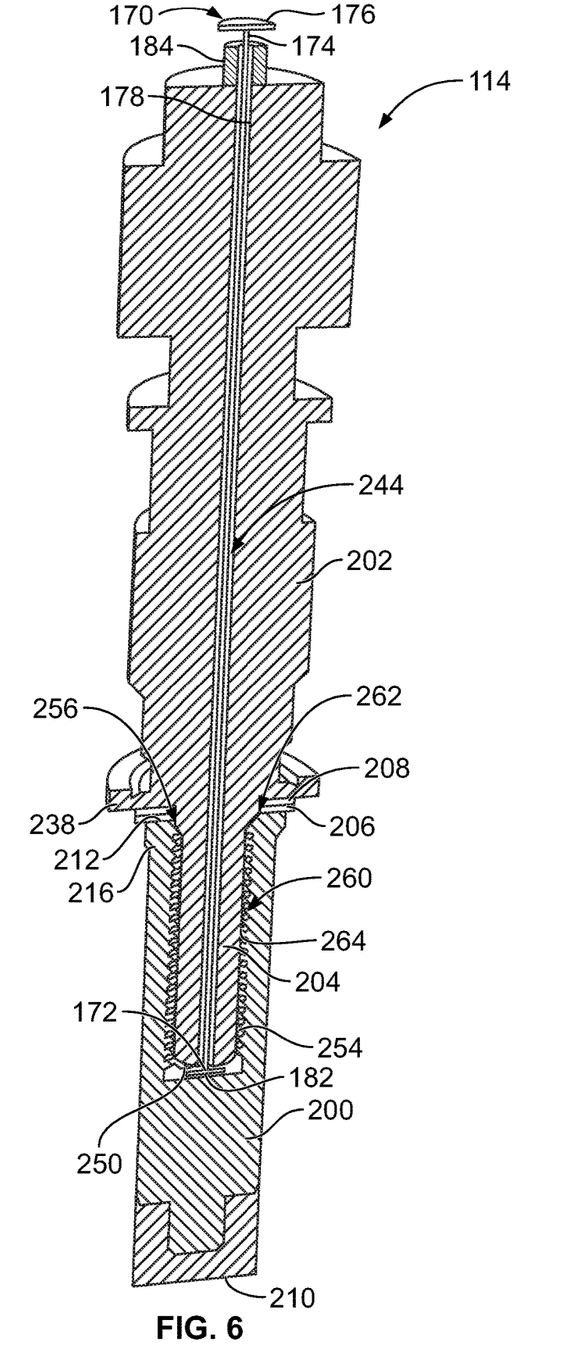
FIG. 6 is a cross-sectional view of the terminal in accordance with an exemplary embodiment.
Figure 7:
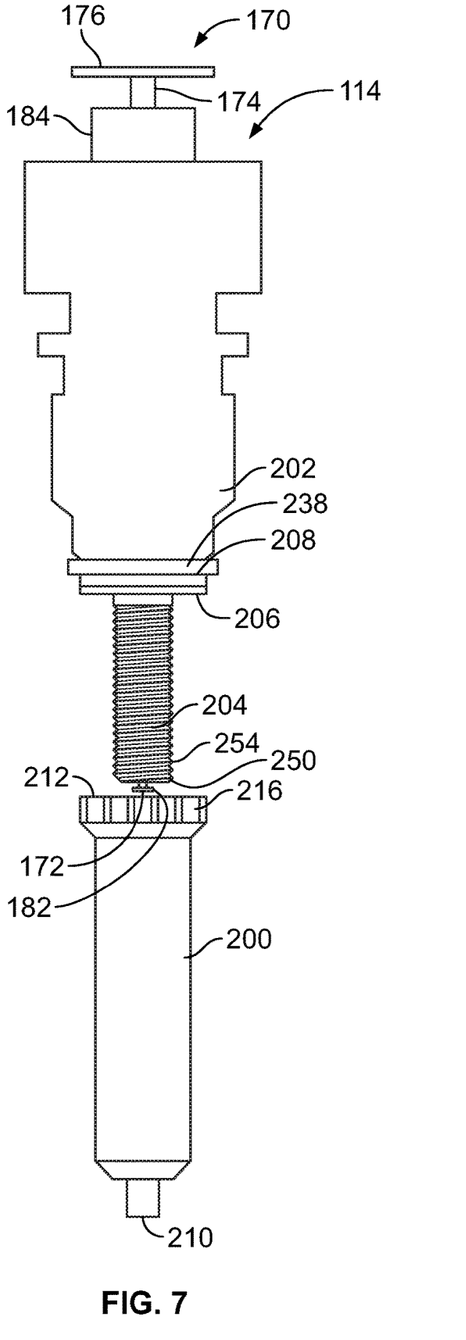
FIG. 7 is a side view of the terminal in accordance with an exemplary embodiment.

FIG. 6 is a cross-sectional view of the terminal 114 in accordance with an exemplary embodiment. FIG. 7 is a side view of the terminal in accordance with an exemplary embodiment. FIGS. 6 and 7 show the mating shaft 204 extending from the head 202. In an exemplary embodiment, the mating shaft 204 is integral with the head 202. For example, the mating shaft 204 and the head 202 are a unitary, monolithic structure. The mating shaft 204 is separate and discrete from the replaceable pin 200. In the illustrated embodiment, the temperature sensor channel 244 extends through the head 202 and the mating shaft 204 to position the temperature sensor 172 at the base of the mating shaft 204. In alternative embodiments, the temperature sensor channel 244 extends through the head 202 to the mating shaft 204 but does not extend through the mating shaft 204. In such embodiments, the temperature sensor 172 is located at the mating shaft 204 to measure the temperature of the mating shaft 204, which is thermally coupled to the replaceable pin 200.

The mating shaft 204 extends forward of the front flange 238. The mating shaft 204 extends to a front end 250. The mating shaft 204 has external threads 254 along the mating shaft 204. In an exemplary embodiment, the threads 254 extend a majority of a length of the mating shaft 204. Optionally, the threads 254 may extend substantially the entire length of the mating shaft 204. In the illustrated embodiment, the temperature sensor channel 244 extends to the front end 250 such that the temperature sensor channel 244 is open along the entire length of the head 202, including the length of the mating shaft 204.

In an exemplary embodiment, the spring 206 extends over the mating shaft 204 and is seated against the front flange 238. The spring 206 may be a wave spring. The spring 206 may be a disc spring. The spring 206 includes an opening 256 that receives the mating shaft 204. The spring 206 is compressed between the head 202 and the replaceable pin 200. The spring 206 forward biases the replaceable pin 200, such as against the threads 254 of the mating shaft 204. As such, the spring 206 ensures that the replaceable pin 200 is thermally and electrically coupled to the mating shaft 204. In an exemplary embodiment, the seal 208 extends over the mating shaft 204. The seal 208 may be sealed against the front flange 238 and/or the drive base 216 and/or the mating shaft 204.

In an exemplary embodiment, the replaceable pin 200 includes a bore 260 at the rear 212. The bore 260 has an opening 262 at the rear 212 that receives the mating shaft 204. The bore 260 includes internal threads 264 that interface with the external threads 254 of the mating shaft 204. The replaceable pin 200 is threadably coupled to the mating shaft 204. The replaceable pin 200 is rotated to install the replaceable pin 200 onto or remove the replaceable pin 200 from the mating shaft 204, such as using the socket tool 190 (shown in FIG. 3). The spring 206 forward biases the replaceable pin 200 to press the threads 264 of the replaceable pin 200 against the threads 254 of the mating shaft 204 to maintain mechanical, electrical and thermal coupling between the replaceable pin 200 and the mating shaft 204. The spring 206 maintains the positive force between the threads 254, 264 during thermal expansion and contraction of the replaceable pin 200 and the mating shaft 204.

The temperature sensor 172 extends through the head 202 and the mating shaft 204 to sense the temperature of the terminal 114 proximate to the mating interface of the replaceable pin 200. In an exemplary embodiment, the temperature sensor 172 is located remote from the rear of the terminal 114. The temperature sensor 172 extends through the temperature sensor channel 244 toward the front of the terminal 114. In an exemplary embodiment, the temperature sensor 172 is located closer to the front of the terminal 114 than the rear of the terminal 114. In an exemplary embodiment, the temperature sensor 172 is generally axially aligned with a centroid of the pin 200 approximately centered between the pin front 210 and the pin rear 212. In the illustrated embodiment, the temperature sensor 172 is located at the front end 250 of the mating shaft 204. The temperature sensor 172 engages the mating shaft 204, and is thus thermally coupled to the mating shaft 204 to sense the temperature of the replaceable pin 200 through the mating shaft 204. The temperature sensor 172 may engage the replaceable pin 200 to directly sense the temperature of the replaceable pin 200.

In an exemplary embodiment, the temperature sensor assembly 170 includes a thermal interface pad 182 at the temperature sensor 172. The thermal interface pad 182 creates a thermal bridge between the temperature sensor 172 and the mating shaft 204 and/or the replaceable pin 200. The thermal interface pad 182 is electrically insulating to electrically isolate the temperature sensor 172 from the terminal 114.

In an exemplary embodiment, the temperature sensor assembly 170 includes a retainer 184 coupled to the sleeve 178 and/or the leads 174 to support the temperature sensor assembly 170 relative to the terminal 114. The retainer 184 provides strain relief for the leads 174. The retainer 184 may support the temperature sensor circuit 176.

Figure 8:
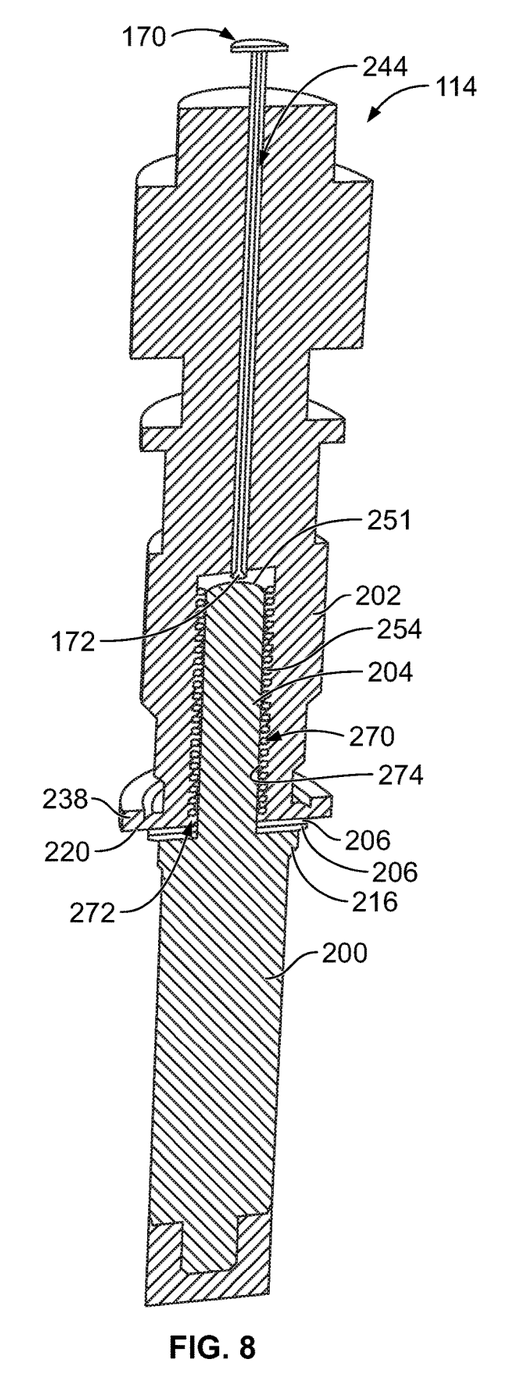
FIG. 8 is a cross-sectional view of the terminal in accordance with an exemplary embodiment.

FIG. 8 is a cross-sectional view of the terminal 114 in accordance with an exemplary embodiment. FIG. 8 shows the mating shaft 204 extending from the replaceable pin 200 rather than the head 202. In an exemplary embodiment, the mating shaft 204 is integral with the replaceable pin 200. For example, the mating shaft 204 and the replaceable pin 200 are a unitary, monolithic structure. The mating shaft 204 is separate and discrete from the head 202.

The mating shaft 204 extends rearward of the drive base 216. The mating shaft 204 extends to a rear end 251. The mating shaft 204 has the exterior threads 254 along the mating shaft 204. In the illustrated embodiment, multiple springs 206 extend over the mating shaft 204 in a stacked arrangement between the front flange 238 of the head 202 and the drive base 216 of the replaceable pin 200. In the illustrated embodiment, the springs 206 are arranged front-to-back and nested with each other. Providing multiple springs 206 increases the spring forces acting between the replaceable pin 200 and the head 202.

In an exemplary embodiment, the head 202 includes a bore 270 at the front 220. The bore 270 has an opening 272 at the front 220 that receives the mating shaft 204. The bore 270 includes internal threads 274 that interface with the external threads 254 of the mating shaft 204. The head 202 is threadably coupled to the mating shaft 204. The replaceable pin 200 and the mating shaft 204 are rotated to install the replaceable pin 200 onto the head 202 or remove the replaceable pin 200 from the head 202, such as using the socket tool 190 (shown in FIG. 3). The spring 206 forward biases the replaceable pin 200 to press the threads 254 of the mating shaft 204 against the threads 274 of the head 202 to maintain mechanical, electrical and thermal coupling between the mating shaft 204 and the head 202. The spring 206 maintains the positive force between the threads 254, 274 during thermal expansion and contraction of the mating shaft 204 and the head 202.

The temperature sensor channel 244 extends through the head 202. The temperature sensor assembly 170 extends through the temperature sensor channel 244 to thermally couple the temperature sensor 172 with the mating shaft 204. As the replaceable pin 200 heats up during charging, the heat is transferred directly into the mating shaft 204 and sensed by the temperature sensor 172 coupled to the mating shaft 204.

Figure 9:
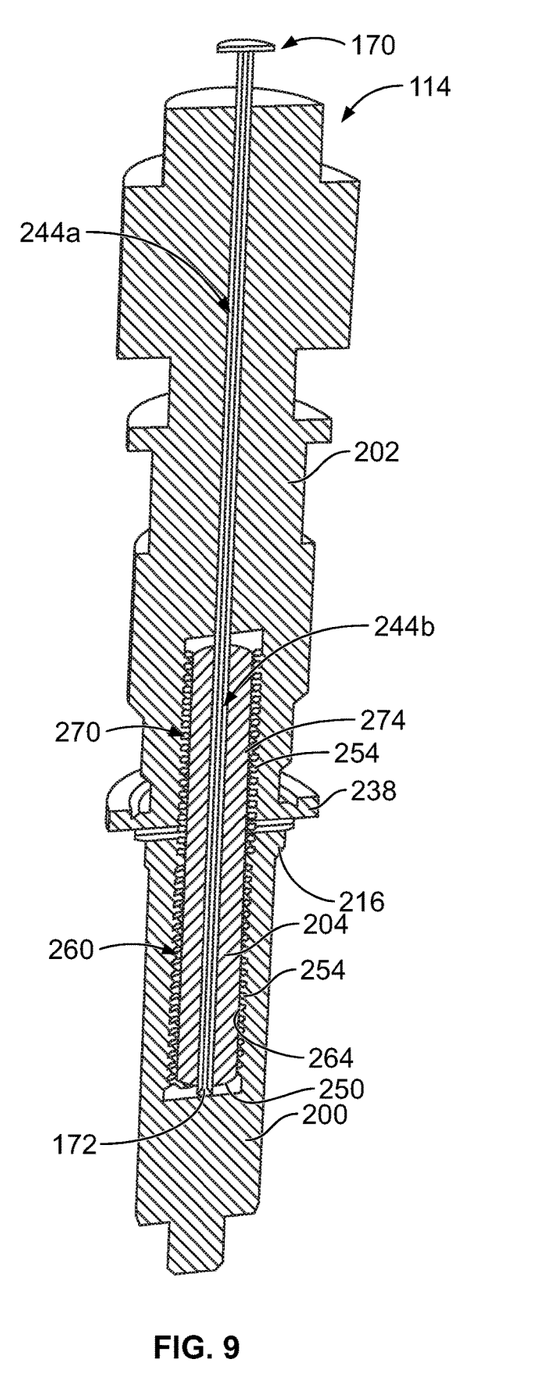
FIG. 9 is a cross-sectional view of the terminal in accordance with an exemplary embodiment.

FIG. 9 is a cross-sectional view of the terminal 114 in accordance with an exemplary embodiment. FIG. 9 shows the mating shaft 204 extending between the replaceable pin 200 and the head 202. In an exemplary embodiment, the mating shaft 204 is separate and discrete from the replaceable pin 200 and is separate and discrete from the head 202. For example, the mating shaft 204 is a threaded rod being threaded along substantially an entire length of the mating shaft 204, such as at both ends of the mating shaft 204. The top of the mating shaft 204 is received in the bore 270 of the head 202 and threadably coupled to the head 202. The bottom of the mating shaft 204 is received in the bore 260 of the replaceable pin 200 and threadably coupled to the replaceable pin 200. The threads 254 of the mating shaft 204 threadably engage the threads 264 of the replaceable pin 200 and threadably engage the threads 274 of the head 202.

The temperature sensor channel 244a extends through the head 202 in the temperature sensor channel 244b extends through the mating shaft 204. The temperature sensor assembly 170 extends through the temperature sensor channel 244a and the temperature sensor channel 244b. The temperature sensor 172 is thermally coupled to the replaceable pin 200 at the front end 250 of the mating shaft 204. As the replaceable pin 200 heats up during charging, the temperature of the replaceable pin 200 is sensed by the temperature sensor 172.

Figure 10:
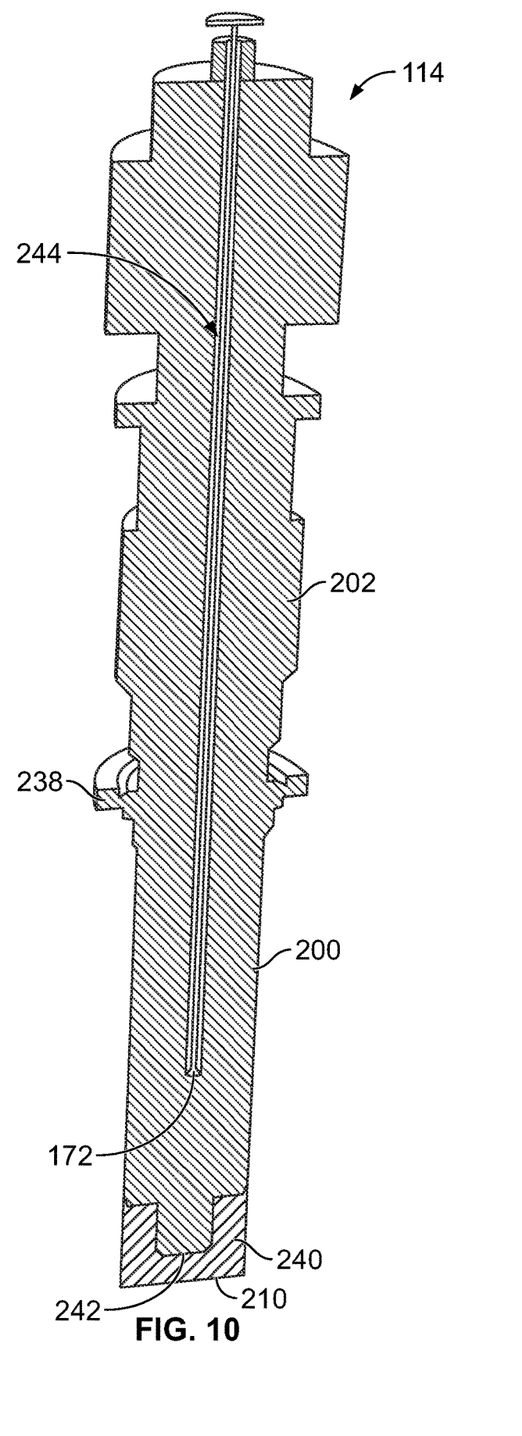
FIG. 10 is a cross-sectional view of the terminal in accordance with an exemplary embodiment.

FIG. 10 is a cross-sectional view of the terminal 114 in accordance with an exemplary embodiment. The terminal 114 is a one-piece terminal where the pin 200 is integral with the head 202. The temperature sensor channel 244 extends through the pin 200 and the head 202. In the illustrated embodiment, the temperature sensor channel 244 extends partially through the pin 200 and stops remote from the front 210 of the pin 200. The temperature sensor 172 is loaded into the temperature sensor channel 244 to the bottom of the temperature sensor channel 244. The temperature sensor 172 is axially aligned with the mating interface of the pin 200. For example, the temperature sensor 172 is positioned approximately centered along the pin 200 (for example, centered between the flange 238 and the front 210 of the pin 200). The temperature of the replaceable pin 200 is sensed by the temperature sensor 172. In an alternative embodiment, the temperature sensor channel 244 may extend along the entire length of the pin 200 to the front 210 of the pin 200. The temperature sensor 172 may be located at the front 210 of the pin 200 and covered by the cap 240 At the tip 242 of the pin 200.

Figure 11:
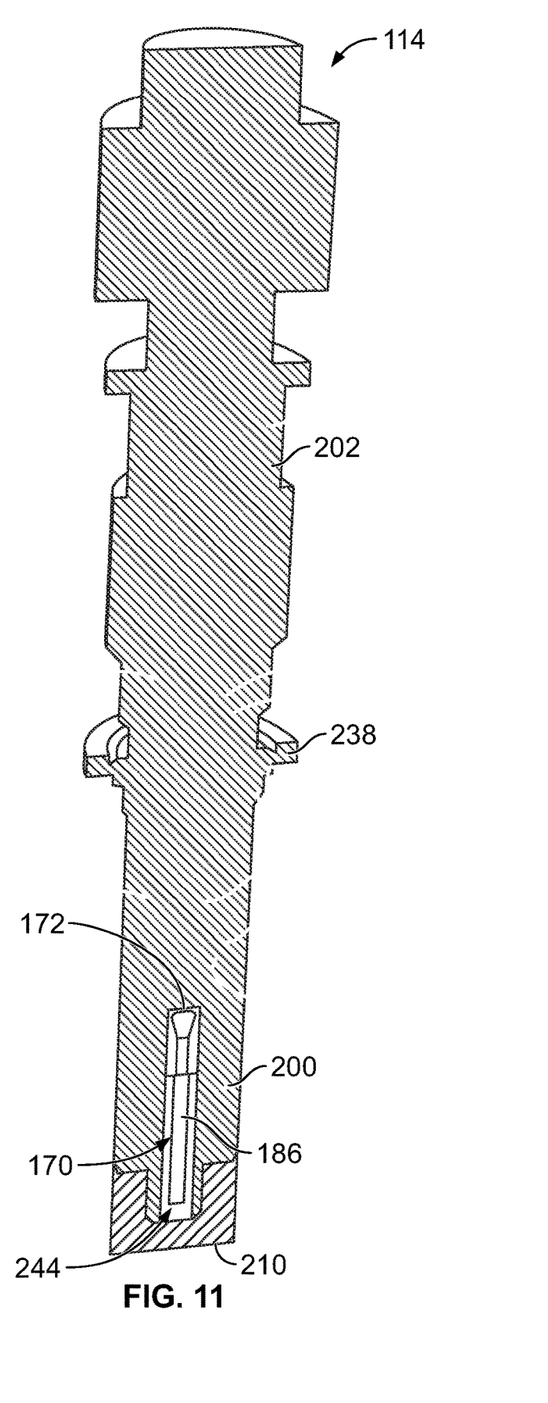
FIG. 11 is a cross-sectional view of the terminal in accordance with an exemplary embodiment.

FIG. 11 is a cross-sectional view of the terminal 114 in accordance with an exemplary embodiment. The temperature sensor channel 244 is open at the pin front 210 and extends into the pin 200. The temperature sensor channel 244 does not extend into the head 202. In an alternative embodiment, the temperature sensor channel 244 may extend from the side rather than front 210 of the pin 200, which may be plugged or closed to the exterior. The temperature sensor assembly 170 is loaded into the temperature sensor channel 244 with the temperature sensor 172 thermally coupled to the pin 200. The temperature sensor assembly 170 includes a communication module 186, such as a wireless antenna, to communication wirelessly with the temperature sensor circuit 176.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A terminal for a charging inlet assembly comprising:
 a head at a rear of the terminal, the head configured to be secured in a terminal channel of a housing of the charging inlet assembly, the head having a terminating end configured to be terminated to a power cable, the head having a temperature sensor channel extending longitudinally therethrough, the temperature sensor channel being open at the rear of the terminal;
 a pin at a front of the terminal, the pin having an outer surface defining a separable mating interface for mating engagement with a charging conductor of a charging connector; and a temperature sensor assembly received in the temperature sensor channel, the temperature sensor assembly including a temperature sensor and a lead extending from the temperature sensor through the temperature sensor channel, the temperature sensor being axially aligned with the separable mating interface of the pin within an interior of the terminal for sensing a temperature of the pin.

2. The terminal of claim 1, wherein the temperature sensor assembly includes a sleeve electrically isolating the lead from the pin and the head.

3. The terminal of claim 1, wherein the temperature sensor assembly includes a temperature sensor circuit coupled to the lead.

4. The terminal of claim 3, wherein the lead extends to the rear of the head, the temperature sensor circuit being located exterior of the head rearward of the lead.

5. The terminal of claim 1, wherein the temperature sensor assembly includes a thermal interface pad between the temperature sensor and the pin.

6. The terminal of claim 1, wherein the temperature sensor is located closer to the front of the terminal than the rear of the terminal.

7. The terminal of claim 1, wherein the temperature sensor channel extends along a longitudinal axis of the head.

8. The terminal of claim 1, further comprising a seal between the temperature sensor assembly and the head configured to seal the temperature sensor channel.

9. The terminal of claim 1, further comprising a retainer coupled to the lead to secure the temperature sensor assembly in the temperature sensor channel.

10. The terminal of claim 1, wherein the pin is separate and discrete from the head, the pin being removable from the head, the temperature sensor channel extending through the head to the pin.

11. The terminal of claim 10, wherein the pin is threadably coupled to the head.

12. The terminal of claim 11, wherein the head includes a threaded shaft at a front of the head, the pin including a threaded bore receiving the threaded shaft, the temperature sensor channel extending through the threaded shaft.

13. The terminal of claim 12, wherein the threaded shaft is thermally coupled to the pin, the temperature sensor engaging the threaded shaft to sense the temperature of the pin through the threaded shaft.

14. The terminal of claim 10, further comprising a spring between the pin and the head.

15. The terminal of claim 10, wherein the head extends between a head front and a head rear, the temperature sensor being positioned at or forward of the head front.

16. The terminal of claim 1, wherein the pin extends between a pin front and a pin rear, the temperature sensor being axially aligned with a centroid of the pin approximately centered between the pin front and the pin rear.

17. A terminal for a charging inlet assembly comprising:
a head at a rear of the terminal, the head configured to be secured in a terminal channel of a housing of the charging inlet assembly, the head having a terminating end configured to be terminated to a power cable, the head having a temperature sensor channel extending longitudinally therethrough, the temperature sensor channel being open at the rear of the terminal;
a replaceable pin at a front of the terminal, the replaceable pin being removably coupled to the head, the replaceable pin having a front and a rear, the replaceable pin having an outer surface defining a separable mating interface for mating engagement with a charging conductor of a charging connector; and
a temperature sensor assembly received in the temperature sensor channel, the temperature sensor assembly including a temperature sensor and a lead extending from the temperature sensor through the temperature sensor channel, the temperature sensor being axially aligned with the pin within an interior of the pin for sensing a temperature of the pin.

18. The terminal of claim 17, wherein the temperature sensor assembly includes a thermal interface pad between the temperature sensor and the pin.

19. The terminal of claim 17, wherein the head includes a threaded shaft at a front of the head, the pin including a threaded bore receiving the threaded shaft, the temperature sensor channel extending through the threaded shaft.

20. A charging inlet assembly comprising:
a housing extending between a front and a rear, the housing having a terminal channel between the front and the rear; and
a terminal received in the terminal channel and coupled to the housing, the terminal extending between a mating end and a terminating end, the terminating end configured to be terminated to a power cable at the rear of the housing, the mating end configured to be mated to a charging connector at the front of the housing, the terminal including a head at the terminating end, the head being received in the terminal channel and being secured in the terminal channel, the head having a temperature sensor channel extending longitudinally therethrough, the temperature sensor channel being open at the rear of the terminal, the terminal including a pin at the mating end, the pin having an outer surface defining a separable mating interface for mating engagement with a charging conductor of a charging connector, the terminal including a temperature sensor assembly received in the temperature sensor channel, the temperature sensor assembly including a temperature sensor and a lead extending from the temperature sensor through the temperature sensor channel, the temperature sensor being axially aligned with the separable mating interface of the pin within an interior of the terminal for sensing a temperature of the pin.

* * * * *